US009476801B2

(12) United States Patent
Uffenkamp et al.

(10) Patent No.: US 9,476,801 B2
(45) Date of Patent: Oct. 25, 2016

(54) DEVICE AND METHOD FOR MONITORING AND CALIBRATING A DEVICE FOR MEASURING THE PROFILE DEPTH OF A TYRE (71) Applicant: Robert Bosch GmbH, Stuttgart (DE)

(72) Inventors: Volker Uffenkamp, Ludwigsburg (DE); Guenter Nobis, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/761,041

(22) PCT Filed: Dec. 9, 2013

(86) PCT No.: PCT/EP2013/075904
§ 371 (c)(1),
(2) Date: Jul. 15, 2015

(87) PCT Pub. No.: WO2014/114403
PCT Pub. Date: Jul. 31, 2014

(65) Prior Publication Data
US 2016/0069779 A1 Mar. 10, 2016

(30) Foreign Application Priority Data
Jan. 22, 2013 (DE) .......................... 10 2013 200 919

(51) Int. Cl.
*G01B 11/24* (2006.01)
*G01M 17/02* (2006.01)
*G01B 11/22* (2006.01)
*G01B 11/25* (2006.01)

(52) U.S. Cl.
CPC ............ *G01M 17/027* (2013.01); *G01B 11/22* (2013.01); *G01B 11/24* (2013.01); *G01B 11/25* (2013.01)

(58) Field of Classification Search
CPC ............ G01M 17/027; G01M 17/02; G01M 17/007; G01M 17/013; G01M 1/02; G01M 1/16; G01M 17/022; G01M 17/025; G01B 11/22; G01B 11/25; G01B 11/272; G01B 7/26; G01B 11/08; G01B 11/24; G01B 11/245
See application file for complete search history.

(56) References Cited

U.S. PATENT DOCUMENTS

| 7,578,180 B2 | 8/2009 | Lionetti et al. |
| 2009/0000370 A1* | 1/2009 | Lionetti ................. G01B 11/22 73/146 |
| 2015/0330773 A1* | 11/2015 | Uffenkamp ............ G01B 11/22 356/631 |

FOREIGN PATENT DOCUMENTS

| DE | 1809459 | 6/1970 |
| DE | 19705047 | 8/1998 |

(Continued)

OTHER PUBLICATIONS

International Search Report for Application No. PCT/EP2013/075904 dated Mar. 11, 2014 (English Translation, 2 pages).

*Primary Examiner* — Michael P Stafira
(74) *Attorney, Agent, or Firm* — Michael Best & Friedrich LLP (57) ABSTRACT A device for measuring the profile of the tread of a tire (12) comprises: a running surface (16), which is provided for the tire (12) to roll on and in which at least one measurement slot (14) is formed; at least one illumination apparatus (4), which is formed and arranged in such a manner that during operation it projects a plurality of light lines (6) through the measurement slot (14) onto the profile to be measured; and at least one image capture apparatus (18), which is formed to capture at least one image of at least one region of the profile to be measured. At least one monitoring and calibration device (22) is formed at at least one measurement slot (14), said monitoring and calibration device having at least one channel-shaped depression (24), which faces the illumination apparatus (4). The at least one depression (24) is formed at an angle to the plane of the running surface (16), which is parallel to the direction of a light beam, which in the proper state is emitted by the illumination apparatus (4) and is incident into the depression (24).

12 Claims, 5 Drawing Sheets (56) References Cited

FOREIGN PATENT DOCUMENTS

| DE | 102006062447 | 7/2008 |
| DE | 102012224260 | 6/2014 |
| EP | 0469948 | 2/1992 |
| EP | 1394503 | 3/2004 |
| EP | 1952092 | 4/2009 |
| JP | 2008185511 | 8/2008 |

* cited by examiner

DEVICE AND METHOD FOR MONITORING AND CALIBRATING A DEVICE FOR MEASURING THE PROFILE DEPTH OF A TYRE

BACKGROUND OF THE INVENTION

The invention relates to a device and a method for monitoring and calibrating a device for measuring the profile depth of a tyre, in particular of a motor vehicle tyre.

In order to measure the profile depth of tyres, different methods for manually or automatically measuring the profile depth are known, which comprise methods for measuring in a mechanical or non-contact manner as well as methods for measuring a stationary or rolling vehicle or, respectively, tyre.

Triangulation methods using laser scanners for measuring profile depth on a roller chassis dynamometer are described, for example, in the German patent specification DE 197 05 047 A1 and the European patent specification EP 1 394 503 B1.

The German patent specification DE 10 2006 062 447 A1 likewise measures a region of the tyre profile while the tyre rolls over an opening by means of a light section triangulation method. The method provides that an illumination line is guided with the aid of a prism that rotates at a high speed transversely to the rolling direction of the wheel across the profile surface. The entire section of the tyre can be scanned sequentially and with high density by means of the illumination line that is displaced in a parallel manner, while the tyre surface located on the opening is situated in the resting state relative to the measuring device.

The European patent specifications EP 0 469 948 B1 and EP 1 952 092 B1 as well as the American patent specification U.S. Pat. No. 7,578,180 B2 describe further variants of triangulation methods for measuring the profile of the tread of a tyre while the tyre traverses an opening.

The German patent specification DE 10 2012 224 260 describes a device for measuring the profile of the running surface of a tyre, said device comprising a plurality of measuring modules that are disposed adjacent to one another and transversely to the rolling direction of the wheel and comprise in each case an illumination apparatus and an image capture apparatus.

In several embodiments, the illumination apparatuses are designed such that they project a pattern, which comprises a plurality of light lines, onto the profile of the tyre. The illumination apparatuses can thereby be particularly designed in such a manner that the individual light lines of the pattern are spatially coded so that said light lines can be unambiguously identified. Such an unambiguous identifiability of the light lines is necessary in order to achieve a high degree of measuring accuracy in connection with a large number of light lines. A spatial coding can, e.g., be implemented by means of a suitably designed diffractive optical element which generates a line pattern which has a spacing that varies between lines. As an alternative, the width of the lines, the line pattern and or the shape of the lines can also be varied.

The application of such profile depth measuring instruments, which are based on a triangulation method, in, for example, entrances to gas stations and the like requires continuous use 24 hours a day in harsh environmental conditions which include, e.g., such things as vibrations and changing temperatures.

As a result of the environmental factors, the mechanical suspension of the illumination apparatuses and image capture apparatuses as well as possibly of further optical elements for beam deflection, such as, e.g., mirrors or prisms, is heavily stressed, so that the factory-provided calibration can no longer be seen as valid in certain circumstances. In order to ensure the constructive and mechanical long-term stability of the optical elements, which are used for highly precise measuring tasks, against mutual tilting, twisting, distortion and displacement, enormous demands are placed on the material, statics and the constructive design of the mounting suspensions and connections.

It is the aim of the invention to provide an improved device and an improved method for the optical measurement of the profile depth of a tyre, in particular the tyre of a motor vehicle, which enable a high quality of measurement to be provided with the lowest possible design complexity and with the lowest possible maintenance requirements over a service life that is as long as possible.

SUMMARY OF THE INVENTION

A device according to the invention for measuring the profile of the tread of a tyre comprises a running surface which is provided for the tyre to roll on when carrying out the measurement and in which at least one measurement slot is formed. The device also comprises at least one illumination apparatus, which is formed and arranged in such a manner that during operation it projects a plurality of light lines through the measurement slot onto the profile of the tyre to be measured; and at least one image capture apparatus, which is formed to capture at least one image of at least one region of the profile to be measured. The at least one illumination apparatus and the at least one image capture apparatus are designed and arranged in such a manner that the illumination direction of said illumination apparatus and the direction of the image capture by means of said image capture apparatus are oriented neither parallel to one another nor orthogonally to the running surface of the tyre. At least one monitoring and calibration element is formed at at least one measurement slot, said monitoring and calibration element having at least one channel-shaped depression, the opening of which faces the illumination apparatus and the image capture apparatus.

Such an inventive monitoring and calibration element enables the known geometry predefined by the monitoring and calibration element to be optically recorded, the recorded image of the known geometry to be compared with previously stored data and the current image geometry of the measuring device to be determined in this manner. Changes with respect to the factory-provided calibration can be recognized in this way and be taken into account and corrected by means of a self-calibration.

A method according to the invention for monitoring and calibrating a device for optically measuring the profile depth of a tyre comprises the steps: projecting a defined light onto at least one inventive monitoring and calibration device and capturing the light reflected from the monitoring and calibration device and, e.g., performing an evaluation by means of a comparison with previously stored data in order to calculate current calibration parameters.

A monitoring and calibration element according to the invention forms a three dimensional object space jointly with the measurement slot. The measurement window of the illumination and image capture apparatus is selected in such a way that the monitoring and calibration element as well as the measurement slot is contained in the three dimensional object space. Using the known geometry of the monitoring and calibration element, the correlation between illumination apparatus and image capture apparatus, which has possibly changed due to environmental influences, can be calibrated in the three dimensional object space of the measurement slot. This correlation can also include further optical elements for beam deflection, such as, e.g., mirrors and prisms.

A method according to the invention for measuring the profile depth of at least one tyre includes carrying out a method according to the invention for monitoring and calibrating the measuring device prior to measuring the profile depth of the tyre or tyres.

Regular monitoring and calibration of the measuring device ensures a consistent measurement accuracy over the entire operating life of the measuring device.

If a special line coding is used during the measurement of the profile depth, as was previously described, it is ensured by means of a self-monitoring according to the invention that the coding and decoding of the light lines still reliably functions even if the measuring device is out of adjustment and the light lines are offset in relation to the factory-provided setting and/or are no longer projected parallel to the slot length but offset to the measurement slot. A maladjustment ascertained during monitoring is taken into account when carrying out the image analysis to clearly identify the individual lines (decoding).

If the measuring device is greatly out of adjustment, this can also lead to the light lines being out of alignment in the direction of travel to the extent that one or a plurality of the light lines are no longer imaged onto the measurement slot or completely disappear from the field of view of the image capture device. A self-monitoring according to the invention can also control how many light lines in total are still visible and available for the evaluation. If the misalignment of the light lines in the direction of travel is so great that the number of the light lines imaged onto the measurement slot falls below a predefined limit value of, for example, 30 light lines, a manual readjustment is required within the framework of maintenance work and a corresponding item of service information is generated. A readjustment is also required if an offset of the light lines is detected transversely to the direction of travel so that the measurement slot is no longer illuminated up to the edge thereof on one side.

In order to perform the self-monitoring and self-calibration, the measuring system is transferred into a corresponding calibration/measurement mode at periodic intervals, preferably during measurement pauses in which the measuring system is not activated during the approach of a motor vehicle. The measurement slot is illuminated with light lines in the calibration/measurement mode and at least one image is captured and stored. The at least one image is analyzed in the measurement and evaluation unit. On the one hand, the current displacement and skew of the light lines is determined and provided for the line decoding. On the other hand, the current calibration parameters are calculated and the factory-provided calibration is possibly overwritten.

The measurement for monitoring and calibration preferably takes place if only a little or no ambient light is present, for example at night. The measurement can furthermore be very readily adapted to the ambient light because the recording performed by the monitoring and calibration element is not a dynamic process in contrast to the actual profile depth measurement which is carried out when the tyre is rolling; and therefore sufficient time is available for the measurement. The measurement and evaluation unit analyzes the data of the image sensor and provides optimal parameters for the illumination apparatus (illumination intensity) and/or for the image capture apparatus (integration time), which parameters prevent an under- or overexposure during the measurement. This process can also be iteratively carried out until optimal image capturing conditions are present.

A self-monitoring and self-calibration of the measuring system enables said system to measure stably in the long term with a high degree of reliability. A breakdown of the device due to the light lines no longer being able to be decoded or a defective measurement of the profile depth of the tyre(s) due to the measuring device being out of adjustment can be avoided and the monitoring and self-calibration can be designed having cost effective and simply embodied mechanical mounting suspensions of the optical elements. This is due to the fact that a possible maladjustment of the optical elements can be recognized by means of the self-monitoring process and compensated for by means of the self-calibration process.

In one embodiment, the angle between the direction in which the illumination apparatus projects the light line onto the tyre and the image acquisition of the associated image capture apparatus is more than 10° and less than 90°, preferably between 20° and 45°, in particular 40°. An angle in the range of 20° to 45° represents a good compromise between a degree of measurement accuracy that is as high as possible and shadowing effects that are as low as possible, which both increase when the angle becomes larger between the projection direction of the illumination apparatus and the image capture direction of the associated image capture apparatus.

In one embodiment, the channel-shaped depressions of the monitoring and calibration element are formed substantially parallel to the rolling direction of the tyre. Channel-shaped depressions which are formed parallel to the rolling direction of the tyre are particularly well suited to simulate a typical profile of a tyre and therefore enable a particularly effective monitoring and calibration.

In one embodiment, the width and/or depth of the channel-shaped depressions correspond(s) to the width or depth of a typical tyre of a motor vehicle. Such depressions are particularly well suited to simulate a typical tyre profile and therefore enable a particularly effective monitoring and calibration of the measuring system.

In one embodiment, the channel-shaped depressions are formed perpendicularly to the plane of the road just like the grooves of a typical tyre profile; thus enabling said depressions to simulate a typical tyre profile in a particularly effective manner.

In one embodiment, the channel-shaped depressions are formed at an acute angle to the plane of the road. Said channel-shaped depressions can particularly be formed in a direction to the plane of the road which is parallel to the direction of light which in the proper state is emitted by the illumination apparatus and is incident into the channel-shaped depressions. By means of such obliquely designed, channel-shaped depressions, a shading of the base of the depressions is reduced or completely prevented in the case of obliquely incident light. The loss of items of measurement information is thus prevented and the quality of the monitoring and calibration can be increased.

In one embodiment, the measurement slot and the monitoring and calibration element are integrally formed as a common element. As a result of being formed as a common element, the measurement slot and the monitoring and calibration element permanently have a clearly defined spatial relationship to one another; thus enabling a high degree of quality of the monitoring and calibration to be ensured on a long-term basis.

In one embodiment, the at least one illumination apparatus and the at least one image capture apparatus are disposed in a traversable channel and the measurement slot and the monitoring and calibration element are formed in or on a cover of the traversable channel.

In one embodiment, the device comprises a plurality of measuring modules disposed adjacently to one another and transversely to the rolling direction, wherein each of the measuring modules has respectively at least one illumination apparatus, at least one image capture apparatus, at least one measurement slot and at least one calibration device. Such a modular design of the measuring device enables said measuring device to be optimally adapted to the maximum tyre width to be measured.

In one embodiment, the measurement slots of the measuring modules are disposed in the rolling direction so as to be offset from one another in order to prevent said measuring modules from mutually interfering with one another. In this way, light being emitted from one illumination apparatus of a measuring module can be prevented from being captured by the image capture apparatus of another measuring module.

The invention is explained below in detail with the aid of the attached drawings.

BRIEF DESCRIPTION OF THE DRAWINGS

FIG. 3b shows an enlarged cutout of the illuminated tyre profile of FIG. 3a.

DETAILED DESCRIPTION

Figure 1:
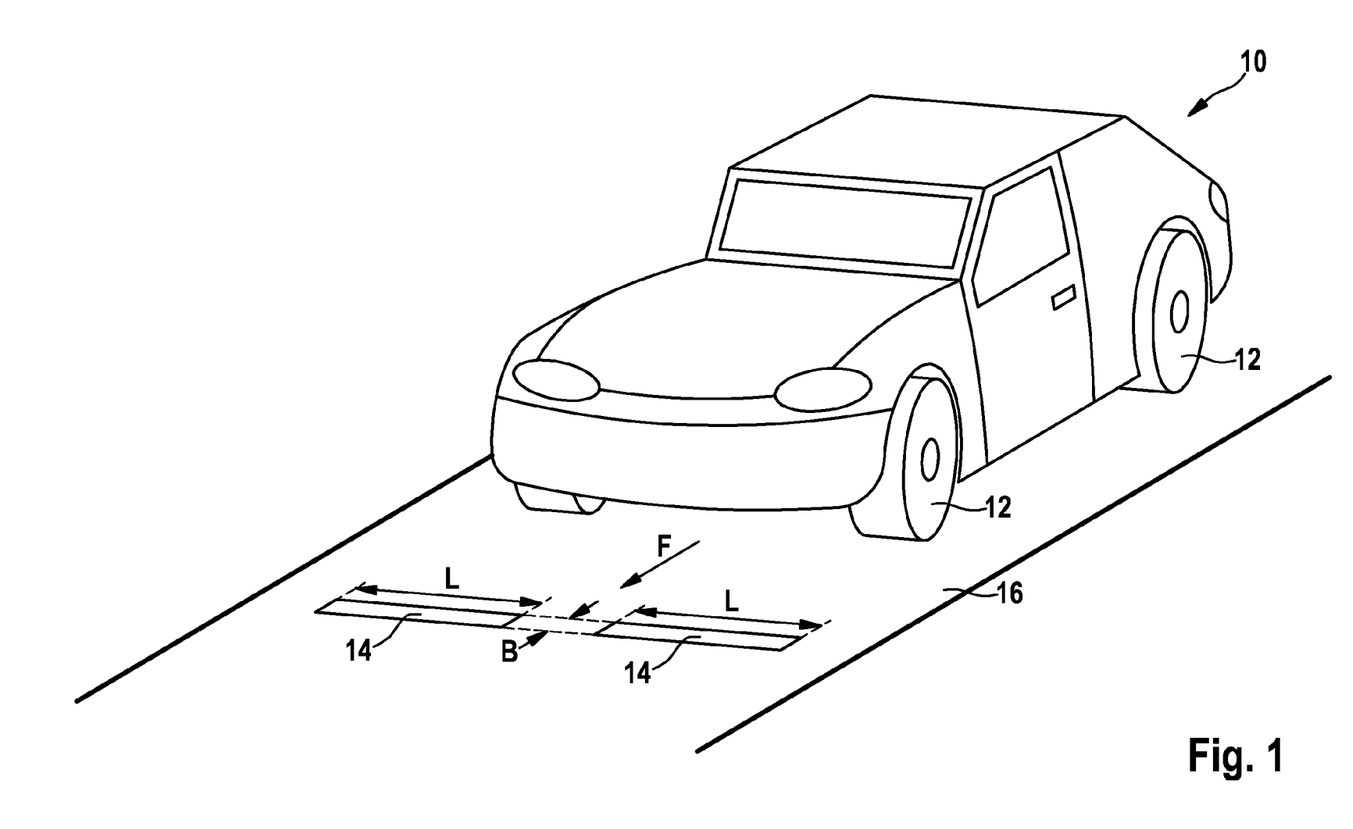
FIG. 1 shows a schematic perspective view of a measuring station for measuring the profile depth of the tread of a tyre.

FIG. 1 shows a measuring station for measuring the profile depth of the tread of a tyre comprising a running surface 16 in which two measurement slots 14 are formed in the lane of a vehicle approaching in the direction of travel F. The measurement takes place while the vehicle comprising the wheels or, respectively, tyres thereof travels across at least one of the two oblong measurement slots 14 which are formed in the running surface 16 and are oriented in the longitudinal extension thereof transversely to the running direction of the tyres 12 of the motor vehicle 10.

The measurement slots 14 have an extension (length) L which runs transversely to the direction of travel F of the vehicle and corresponds to at least the width of the maximum contact patch of the tyres to be measured. In addition, the variance in the axles tracks of the vehicles 10 to be measured is however to be taken into account in order to make possible an automatic measurement of as large a number of different vehicle types as possible. If the measuring device is also to be suited to commercial vehicles, the variance in the axle tracks and tyre widths of transporters and trucks with or without dual tyres is also, in particular, to be taken into account.

The width B of the measurement slots 14 parallel to the direction of travel F is on the one hand to be selected significantly smaller than the smallest contact patch of typical tyres. On the other hand, the width B of the measurement slots 14 is also to be selected such that the driving comfort is not unpleasantly compromised when the vehicle crosses over them.

The measurement slots 14 enable the measurement of the profile depth of the tyre to be carried out in an unloaded sub-region of the tread of the tyre 12 to be tested. This has the advantage that measuring errors, which would occur due to the contusion of the tyre material in the contact patch of the tyre 12 that is inevitably caused by the wheel load of the vehicle 10, are avoided.

In addition, a measurement in the region of the contact patch of the tyre 12 virtually corresponds to a measurement at rest because, when rolling on the running surface, each point of the tread of the tyre 12 moves along a cycloid with the physical property that the speed thereof is zero at the contact patch. This has the advantage that no additional uncertainty of measurement is present due to motion blur.

A further advantage of the measurement of the upright tyre profile from below by means of a measurement slot 14 is that even the ambient light is for the most part obscured by the body of the vehicle 10 and the tyre 12, and the measurement is thereby largely independent of changing ambient conditions (such as, e.g., day, night, sun, clouds, . . . ).

A measurement slot 14 having a length L between 500 mm and 700 mm and width B between 30 mm and 50 mm on each vehicle side has, e.g., proven to be suitable for the measurement of passenger vehicles having axle tracks between 1200 mm and 1800 mm in the driveways of repair shops, gas stations or parking lots, inter alia with the assumption of a maximum speed of 15 km/h.

Figure 2:
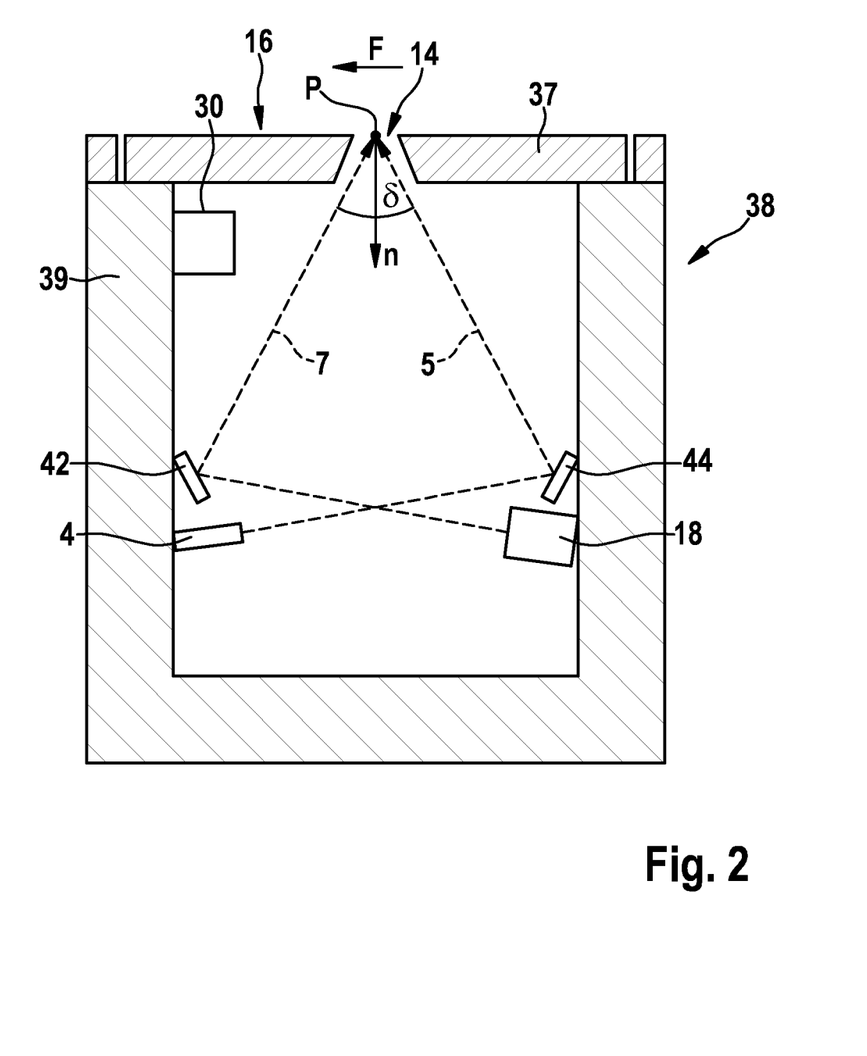
FIG. 2 shows a side sectional view of a device which is designed for measuring the profile depth of the tread of a tyre and is disposed in a traversable channel.

FIG. 2 shows an exemplary arrangement for measuring the tread depth in a schematic cross section. A measuring system according to the invention can expediently be integrated into a traversable channel 38$k$, as they are known and have been proven effective in road construction.

An illumination apparatus 4 and an image capture apparatus 18 are disposed in the traversable channel 38 such that the measurement range of the image capture apparatus corresponds to the measurement slot 14 in the running surface 16.

In order to optimize the available installation space, the image capture lines and the illumination lines are deflected by mirrors 42, 44. A symmetrical arrangement of the optical elements 4, 18, 42, 44 results in the beam lengths for the illumination apparatus 4 and the image capture apparatus being identical and therefore the fan angle of the light planes 5 of the illumination apparatus 4 being just as large as the angle of aperture $\phi$ of the image capture apparatus 18.

If the optical elements 4, 18, 42, 44 as well as the measurement and evaluation apparatus 30 are mounted on a side wall 39 of the traversable channel 38, said optical elements 4, 18, 42, 44 and said measurement and evaluation apparatus 30 are protected from backwater that accumulates on the bottom of the traversable channel 38. If all of the components 4, 18, 42, 44, 32 of the measuring system are mounted on a cover 37 of the traversable channel 38, said components 4, 18, 42, 44, 32 can be easily serviced and/or replaced.

The arrangement of the illumination apparatus 4 and the image capture apparatus 18 shown in FIG. 2 has furthermore the advantage that the apparatuses 4, 18 are well protected from dirt that may fall through the measurement slot 14.

The illumination apparatus 4 and the associated optical component 44 are oriented in such a way that the light lines 6 generated by the illumination apparatus 4 are projected onto the tread of the tyre 12 parallel or approximately parallel to the long side of the measurement slot 14 transversely to the direction of travel F of the vehicle 10 or, respectively, to the running direction of the tyre 12.

The angle δ denotes the angle between the plane 5, in which the light from the illumination apparatus 4 is beamed onto the profile of the tread of the tyre, and the imaging plane 7 at the object point P.

The measuring principle described requires a fixed unchanging relationship between the object, the illumination apparatus 4 and the image capture apparatus 18. By measuring the unloaded sub-region or the tyre contact area by means of the measurement slot 14 in the running surface 16, it is assured that the depth expansion of the profile of the tread of the tyre or, in other words, the normal vector n of the tyre 12 has an identical orientation for every tyre 12 at the point in time of the measurement. The measuring system can also be calibrated in this arrangement.

Figure 3A:
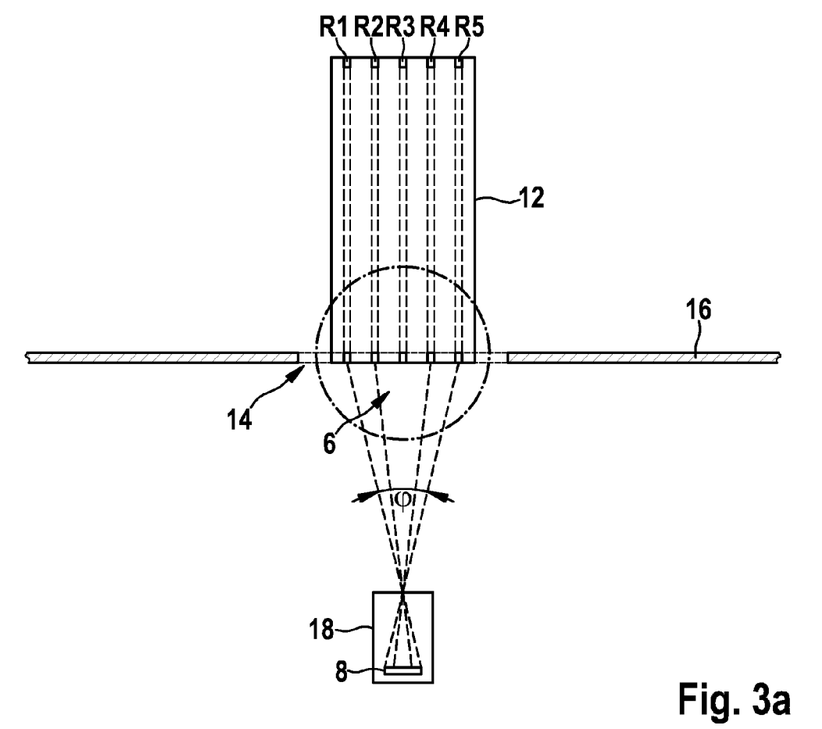
FIG. 3a shows a cross section perpendicular to the plane of the running surface through the center of the tyre orthogonal to the direction of travel of the vehicle.

FIG. 3a shows a cross section through the center of the tyre 12, which is perpendicular to the running surface 16 and orthogonal to the direction of travel F of the vehicle 10, in a schematic depiction. The profile of the tread of the tyre 12 is shown by way of example in a simplified form comprising five longitudinal grooves R1, R2, R3, R4, R5. A light line 6 which is projected from the illumination apparatus 4, which is not depicted in FIG. 3a, onto the profile of the tread of the tyre 12 is projected onto a surface image sensor 8 of the image capture apparatus 18 and recorded by the same.

Figure 3B:
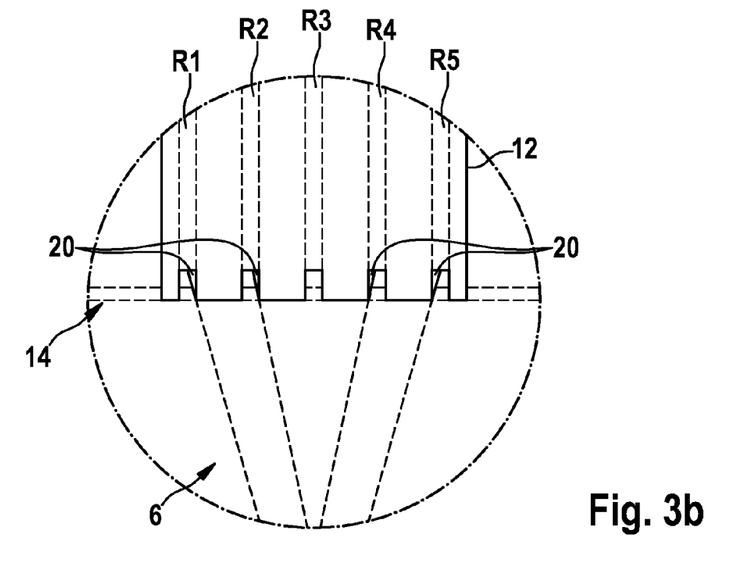

The enlarged depiction of the profile of the tread of the tyre in FIG. 3b illustrates that shadings 20 occur as a function of the width and depth of the grooves R1, R2, R3, R4, R5 when projecting the light lines 6 with an increasing angle of aperture φ of the image capture apparatus 18. The shadings make it impossible to measure the profile depth of the tread from a certain angle of aperture φ because the bottom of the grooves R1, R2, R3, R4, R5 is not or is only insufficiently illuminated.

Figure 4:
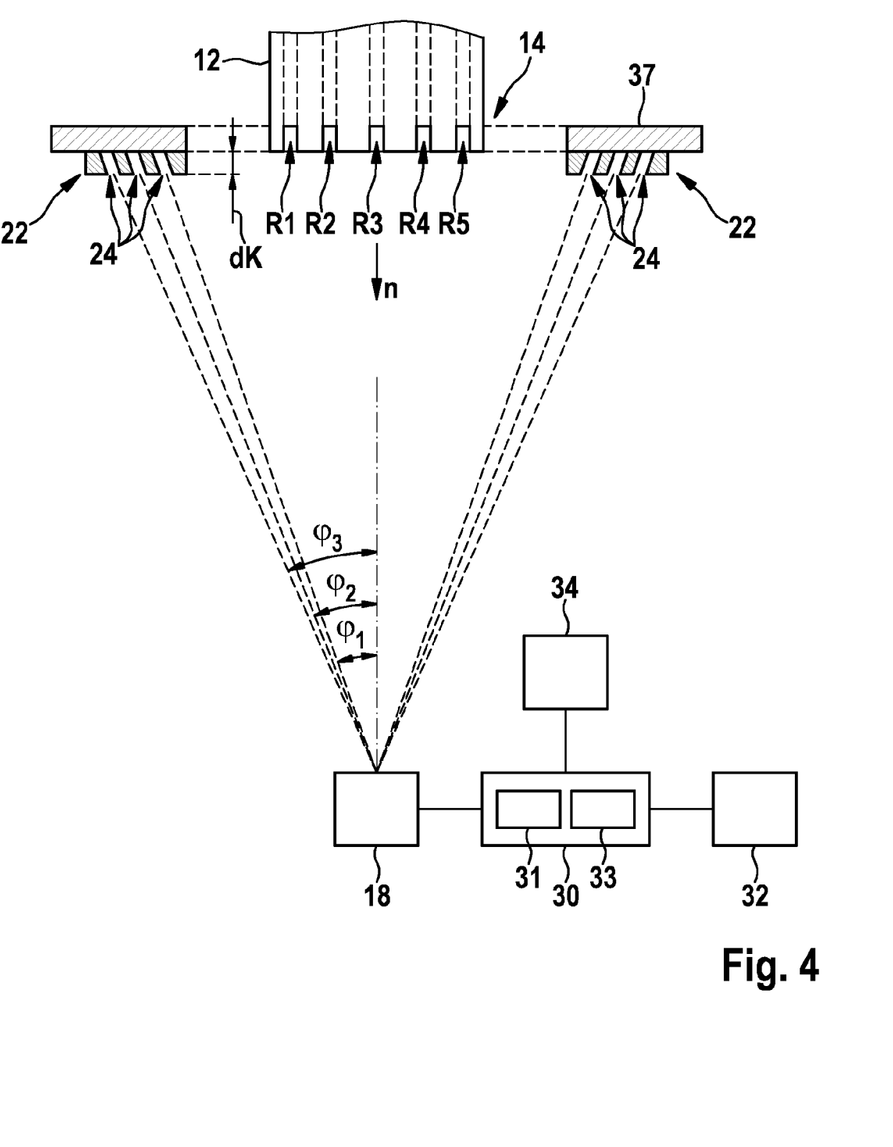
FIG. 4 shows a cutout of a measuring device which is equipped with an exemplary embodiment of an inventive monitoring and calibration device.

FIG. 4 shows a cross section of a measuring device which is equipped with an exemplary embodiment of a monitoring and calibration device according to the invention.

The monitoring and calibration device comprises two monitoring and calibration elements 22 which are mounted in the exemplary embodiment depicted to the right and left of a measurement slot 14 on the cover 37 of a traversable channel 38, which is not shown in FIG. 4, The two monitoring and calibration elements 22 each have three channel-shaped depressions 24 which, analogous to the longitudinal grooves R1, R2, R3, R4, R5 of a typical vehicle tyre, extend substantially parallel to the direction of travel F of the vehicle 10 and perpendicularly to the drawing plane. The width and depth of the channel-shaped depressions 24 correspond approximately to those of a typical profile of a tread of a vehicle tyre 12.

A measurement and evaluation apparatus 30, which is connected electrically or in a wireless manner to the image capture apparatus 18 and is equipped with a computer unit, a storage unit 33 and evaluation software, conducts the analysis of the image data provided by the image capture apparatus 18, the monitoring of the adjustment process, the self-calibration, the calculation of the driving speed of the vehicle 10 and the image analysis to distinguish the tyre type in order to calculate the profile depth of the tread of the tyre. The measurement and evaluation unit 30 can also calculate a profile depth of tread deviation and an extensive profile structure of tread per tyre, the relative deviation of the profile depths of tread and the profile depth of tread deviation of the wheels on each axle, evaluate the profile depth of tread, profile depth of tread deviation and the profile structure of tread for each tyre using defined limit values and evaluate the relative deviation and the difference of the profile depth of tread deviation of the wheels of an axle using defined limit values as well as carry out a summarizing evaluation of the condition of the tyre. The measurement and evaluation unit 30 also controls a display unit 32 for outputting the test results as well as, if needed, the transmission of the measurement and test results to a higher-level server.

As was already mentioned in connection with FIGS. 3a and 3b, shadings 20 of the bottom of the channel-shaped depressions 24 occur as a function of the width and the depth of said channel-shaped depressions 24 and the angle of aperture $\phi_1$, $\phi_2$, $\phi_3$ of the illumination and image capture apparatuses 4, 18, said shadings leading to a reduction of the available items of measurement information and as a result to losses in measurement accuracy. This particularly pertains to the monitoring and calibration elements 22 which are disposed on the left and right side of the measurement slot 14 because the angle of aperture $\phi_3$ is the largest here.

In order to keep the impact of the shadings 20 to a minimum and thus increase the items of measurement information available for the monitoring and calibrating of a device for measuring the profile depth of a tyre, the width of the measurement slot 14 can be reduced, the width of the channel-shaped depressions enlarged and/or the depth of the channel-shaped depressions 24 reduced.

In the exemplary embodiment shown in FIG. 4, the channel-shaped depressions 24 of the monitoring and calibration elements 22 are not formed like the grooves R1, R2, R3, R4, R5 of a typical profile of the tread of a tyre perpendicularly to the plane of the running surface 16, i.e. parallel to the normal vector n of the tyre 12, but rather as obliquely incised, channel-shaped depressions 24. As a result, the extent of the shadings 20 can be reduced. The inclination of the channel-shaped depressions 24 relative to the plane of the running surface 16 is preferably adjusted to the angle of aperture $\phi_1$ of the illumination and image capture apparatuses 4, 18. In this way, it can be ensured that the bottom of each channel-shaped depression 24 of the monitoring and calibration element 22 is completely illuminated and imaged on the surface image sensor 8 of the image capture apparatus 18. Shadings 20 are reduced or even completely prevented and the best possible measurement information can be used for monitoring and calibrating the device for measuring the profile depth of a tyre. The difference in the depth dK between contact patch of the tyre 12 and the surface of the monitoring and calibration element 22 is known and is taken into account during the evaluation.

In order to enable a reliable monitoring and calibration to occur over the long term, it is advantageous if the measurement slot 14 and the at least one monitoring and calibration element 22 form a long-term stable unit so that the position of the monitoring and calibration element 22 does not change in relation to the measurement slot 14. In the exemplary embodiment shown, the monitoring and calibration elements 22 are therefore together with the cover 37, in which the measurement slot 14 is formed, manufactured from one piece, so that a change in the position of the monitoring and calibration elements 22 relative to the measurement slot 14 is excluded.

Figure 5:
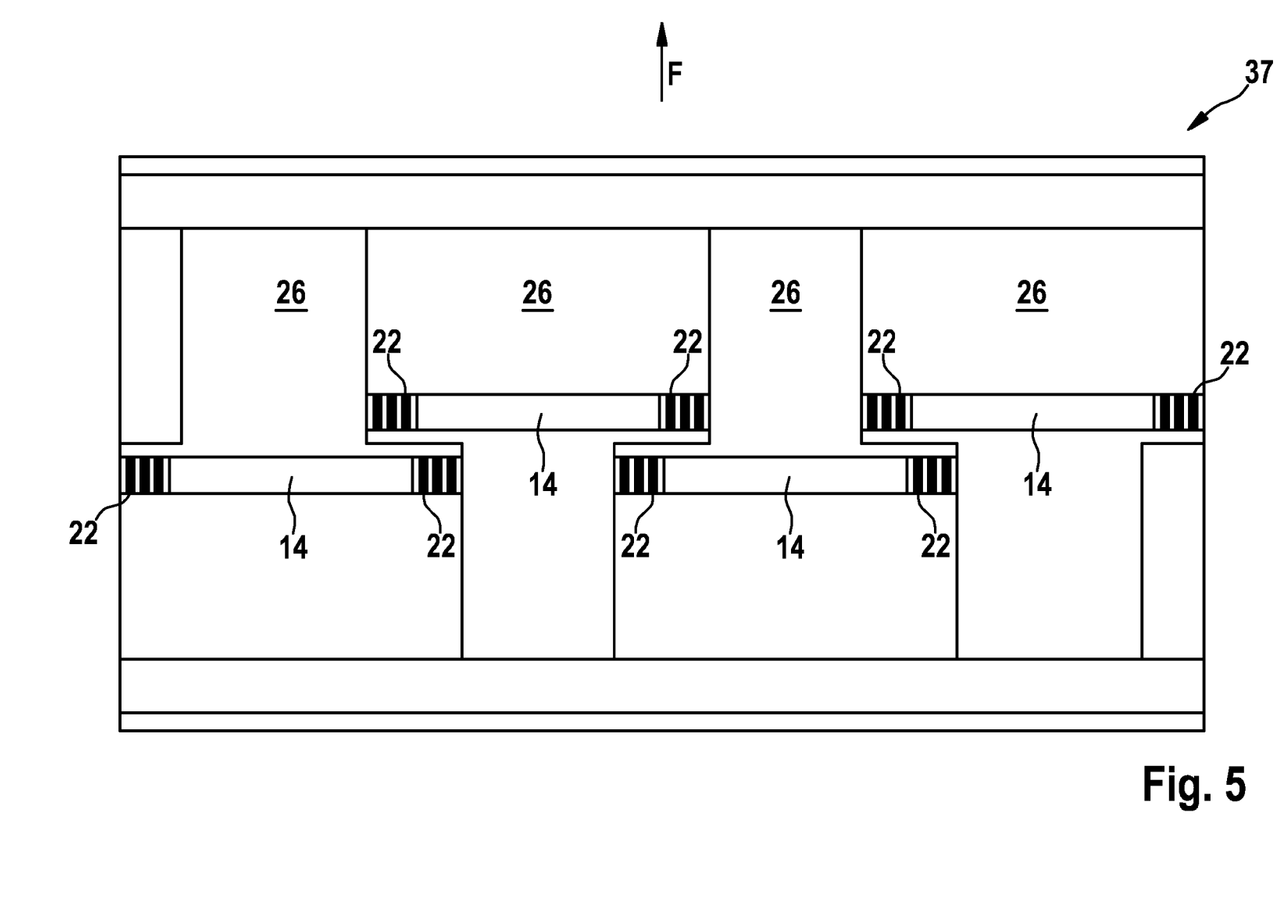
FIG. 5 shows the underside of an exemplary embodiment of a cover comprising a plurality of inventive monitoring and calibration devices in a top view.

FIG. 5 shows the underside of an exemplary embodiment of such a cover 37 in a top view. The cover 37 comprises four identically configured elements 26 which are disposed transversely to the direction of travel F and adjacent to one another, wherein elements 26 adjacent to one another are oriented in each case so as to be offset by 180° with respect to each other. The elements 26 are designed such that the measurement slots 14 are arranged in the direction of travel F so as to be offset to one another. A monitoring and calibration element 22 is disposed in each case at the left and right edge of each of the measurement slots 14, as has been previously described in the application.

A mutual interference of the measurements can be prevented by such an offset arrangement of the measurement slots since it can be excluded that light sent out from an illumination apparatus 4 which is associated with a first measurement slot 14 is recorded by an image capture apparatus 18 which is associated with a second measurement slot 14 and that the ensuing evaluation for monitoring and calibrating a device for measuring the profile depth of a tyre is impaired or even precluded.

The invention claimed is:

1. A device for measuring the profile of the tread of a tyre (12) comprising a running surface for the tyre (12) to roll on, in which at least one measurement slot (14) is formed; at least one illumination apparatus (4), which is formed and arranged in such a manner that during operation it projects a plurality of light lines (6) through the measurement slot (14) onto the profile to be measured; and at least one image capture apparatus (18), which is formed to capture at least one image of at least one region of the profile to be measured; wherein the at least one illumination apparatus (4) and the at least one image capture apparatus (18) are formed and arranged in such a manner that the illumination direction of the illumination apparatus (4) and the image capture direction of the image capture apparatus (18) are oriented neither parallel to one another nor orthogonally to the tread of the tyre (12), characterized in that at least one monitoring and calibration device (22) is formed at at least one measurement slot (14), said at least one monitoring and calibration device (22) having at least one channel-shaped depression (24), wherein the open side of which faces the illumination apparatus (4) and the image capture apparatus (18).

2. The device according to claim 1, wherein the at least one depression (24) is formed as a channel-shaped depression (24) which extends parallel to the rolling direction of the tyre (12).

3. The device according to claim 1, wherein the width and/or depth of the at least one depression (24) correspond(s) to the width or, respectively, depth of the profile of a typical vehicle tyre (12).

4. The device according to claim 1, wherein the at least one depression (24) is formed perpendicularly to the plane of the running surface (16).

5. The device according to claim 1, wherein the at least one depression (24) is formed at an acute angle to the plane of the running surface (16) which in the proper state is emitted by the illumination apparatus (4) and is incident into the depression (24).

6. The device according to claim 1, wherein the measurement slot (14) and the monitoring and calibration device (22) are integrally formed as constituent parts of a common element (37).

7. The device according to claim 6, wherein the at least one illumination apparatus (4) and the at least one image capture apparatus (18) are disposed in a traversable channel (38), and the measurement slot (14) and the monitoring and calibration device (22) are formed in a cover (37) of the traversable channel (38).

8. The device according to claim 1, wherein the device has a plurality of measuring modules that are disposed transversely to the rolling direction and adjacent to one another, each of the measuring modules having in each case at least one illumination apparatus (4), at least one image capture apparatus (18), at least one measurement slot (14) and a monitoring and calibration device (22), wherein the measurement slots (14) of the measuring modules are disposed offset to one another.

9. A method for monitoring and calibrating a device according to claim 1, wherein the method comprises:
projecting a defined light pattern onto the at least one calibration device (22);
capturing and evaluating, by the image capture apparatus (18), light reflected from the monitoring and calibration device (22) in order to calculate current calibration parameters.

10. The method for measuring the profile depth of at least one tyre (12) using a device, wherein the method includes periodically carrying out a method for monitoring and calibrating the device according to claim 9.

11. The device according to claim 5, wherein the at least one depression (24) is formed at an angle to the plane of the running surface (16) which is parallel to the direction of a light beam.

12. The device according to claim 8, wherein the measurement slots (14) of the measuring modules are disposed offset to one another in the rolling direction of the tyre (12).

* * * * *